United States Patent Office 3,336,934
Patented Aug. 22, 1967

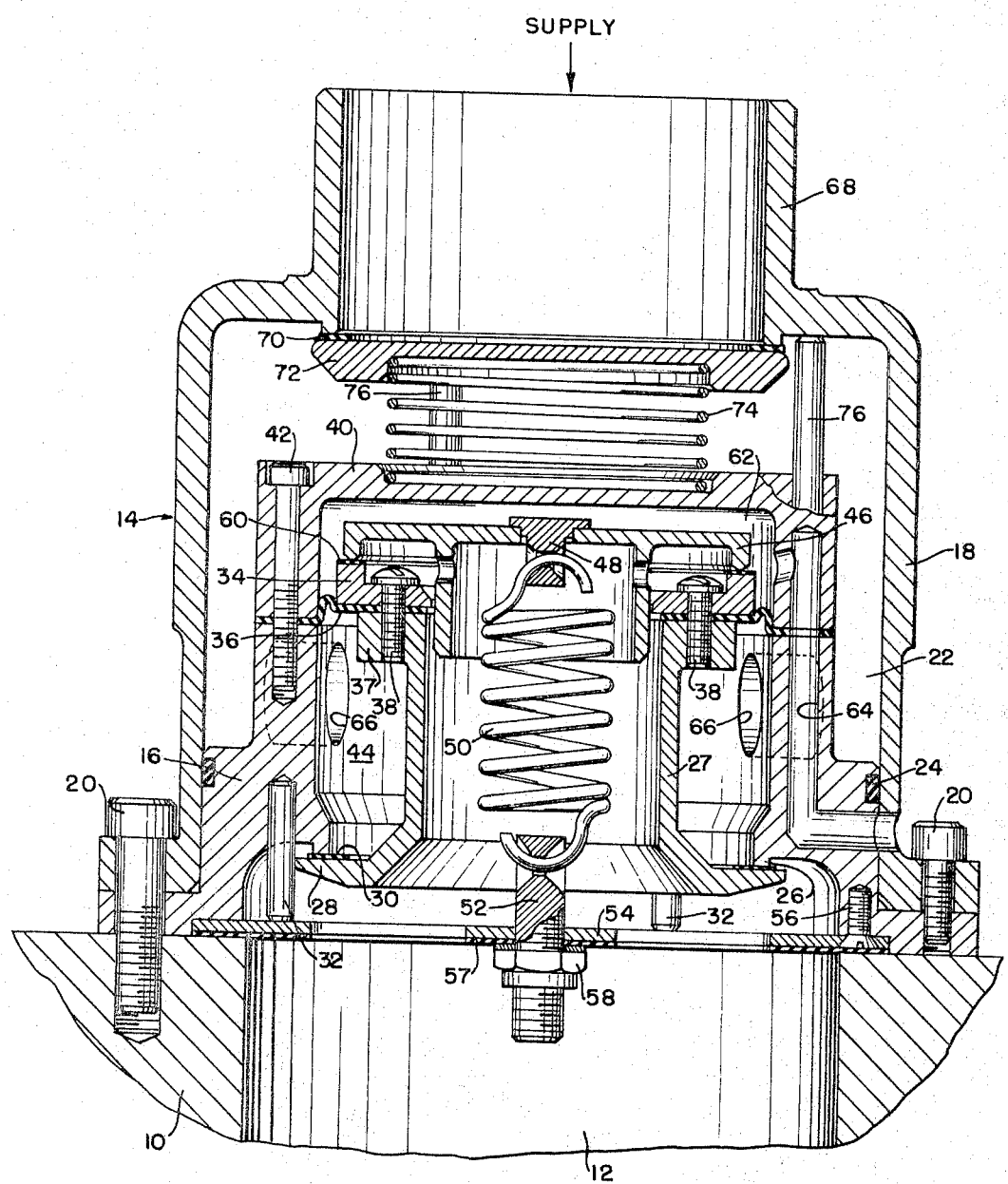

3,336,934
HIGH FLOW CAPACITY FLUID PRESSURE CONTROLLER
Thomas W. Clements, Huntington, N.Y., assignor to Fairchild Hiller Corporation, a corporation of Maryland
Filed May 8, 1963, Ser. No. 278,817
8 Claims. (Cl. 137—116)

The valve of this invention is a high flow capacity fluid pressure controller.

One of the objects of the invention is to provide a valve of this type for effecting high flow capacity with low supply pressures and a small drop in output pressure as the flow requirements vary from small to very large fluid flows.

Another object of the invention is to provide a valve structure in which the supply pressure variation is compensated for by the use of only one diaphragm rather than several, as has heretofore been the case, and also to avoid structures in which friction producing sliding seals are required which introduce errors in the controlled pressure.

Still another object of the invention is to provide in such a valve pressure relief means in the event that the output pressure exceeds a predetermined value for which the valve is adjusted.

Other more detailed objects of the invention will be apparent from the following disclosure of the embodiments of this invention selected for illustrative purposes.

In the accompanying drawings, which illustrate the selected embodiment in full detail, the single figure shows a vertical central cross-sectional view thereof.

The physical structure will be detailed first. As shown, the valve assembly 14 includes a housing composed of an outer shell 18 and a concentric re-entrant inner body 16 forming there between a chamber 22. It will be understood that the parts 16 and 18 are of an overall circular form in horizontal cross section, although this is not necessarily required. Each of these parts is provided with an annular flange by means of which they can be secured together as shown in fluid tight relation by means of the machine screws 20, by means of which they in turn can be attached to any enclosure 10 forming a chamber 12 in which the output or controlled pressure fluid is enclosed.

At this point it may be noted that one advantage of the physical form of this valve is that it could easily be mounted directly in a pipeline by means of flanged connections similar to those shown at the output end. The input end 68 of the main housing 18 could also be provided with flanges as distinguished from the hose type of connection shown. To put it another way, the concentric stacked type of design shown particularly adapts the valve for direct inclusion in a pipeline.

To further prevent leakage between the parts 16 and 18 a suitable form of sealing gasket 24 may be used.

The inner body 16 is in the form of a sleeve which is provided toward its lower end with an annular seat 26. A tubular valve member 27 lies concentrically of the inner body and is provided at its lower end with a valve member 28 which projects radially, as shown, to provide an annular ledge. Desirably the upper surface of this ledge is provided with a seating ring 30 of a resilient sealing material having characteristics dependent upon the nature of the fluid to be controlled. Projecting downwardly from the lower end of the inner body 16 are several pins 32 which are radially positioned so as to form guides coacting with the peripheral edge of the valve member 28. The upper end of the tubular valve member 27 has an annular flange on which a flexible diaphragm 36 is clamped in fluid tight relation by means of a ring 34 and machine screws 38. The outer peripheral edge of the diaphragm 36 is clamped in fluid tight relation on the upper end of the inner body 16 by means of a cap 40 and the machine screws 42.

The upper annular surface of the ring 34 forms a seat on which is mounted a ring 60 of suitable resilient material to form a seat for the relief valve 46. A tension spring 50 is anchored at its upper end to the valve disc 46 by means of fixture 48. Its lower end is anchored to a threaded pin 52 which passes through a spider disc 54. This disc is mounted between the inner body 16 and the structure 10 and held to the inner body by means of the screws 56. A sealing ring 57 is preferably included to make a fluid tight seal at the point of connection between the valve assembly 14 and the structure 10. A threaded nut 58 cooperates with the threaded pin 52 to predetermine the tension in the spring 50 and hence the force with which the valve disc 46 is held normally seated.

With the parts thus arranged three distinct chambers are formed, namely the chamber 22 previously referred to, the chamber 44 below the diaphragm 36 and above the ledge of the valve rim 28 and the chamber 62 formed by the diaphragm 36 and the cap 40. Communication between the chambers 22 and 44 is established by a plurality of relatively large (for very low pressure drop) passages 66 through the wall of the inner body 16. Chamber 62 is always connected to atmosphere through the passage 64.

The lower end of the inlet 68 is provided with a seat having a check valve disc 72 with a sealing ring 70 cooperating therewith. A compression spring 74 lying between the cap 40 and the disc 72 normally holds this check valve closed. Projecting upwardly from the cap 40 are a series of circumferentially spaced pins 76 cooperating with the periphery of the disc 72 to provide guidance therefor.

In describing the operation of this valve it will be understood that fluid under pressure will be supplied to the inlet 68 from any suitable source. Whenever pressure conditions are such as to cause fluid flow, the check valve disc 72 will unseat so that the fluid can flow into and fill the chambers 22 and 44. The check valve is not essential to this invention, however it tends to insure against any back flow of fluid.

The pressure of the supply fluid will act upwardly on diaphragm 36 (including the area of the lower surface of flange 37) tending to hold the supply valve 28 seated. This pressure will also act downwardly on the exposed surface of the valve 28 tending to unseat it. The relationship of their effective areas exposed to the supply fluid are preferably either substantially equal, or the area of the valve 28 slightly less. When the supply valve 28 and the relief valve 60 are closed and their effective areas are equal, the supply pressure forces balance out and have no resultant effect on the valve assembly. Therefore, for the valve to be in balance, the output pressure forces acting upwardly on valve disc 46 must be exactly equal to the downward force of spring 50. The force of spring 50 thus determines the controlled pressure in the outlet, that is the output pressure. When the output pressure falls below the predetermined or preset value, valve 28 opens, supplying fluid to the chamber 12 until the pressure therein builds back to the predetermined value whereupon valve 28 closes. On the other hand, if for any reason the pressure in the output chamber goes above the preset value, valve disc 46 will unseat and fluid will escape to the atmosphere through chamber 62 and passage 64 until the pressure falls to the point where spring 50 will again seat the valve disc 46.

If the output pressure is at or below the force of spring 50 the valve disc 46 will remain closed. In analyzing the effect of the various pressures on the areas exposed thereto, it is noted that the area of the valve 28 is the same as the port area 26 or the port area 60. It is also noted that the area of the ledge of valve 28, which is exposed to the pressure in chamber 44 when the valve is seated, can be defined as the supply port area. The area under the surface of the valve 46 exposed to the output pressure can be defined as the relief port area.

Thus, it will be seen that the valve itself provides an output balancing force determined by the relative areas exposed to it and the pressure on the outlet side to control its operation. The construction of the valve is such that its flow capacity for a given size is very large. There thus results high flow capacity with low supply pressures and with small drop in output pressure as flow requirements vary from small to large flows. In addition, supply pressure variation compensation is obtained with the use of only one diaphragm rather than several as is usual, or alternatively the use of friction-producing sliding seals such as O rings which introduce undesirable errors in the controlled pressure.

From the above disclosure it will be apparent to those skilled in the art that the novel subject matter herein disclosed is capable of considerable variation and detail without departure therefrom. It is intended, therefore, that the scope of this disclosure and the protection afforded thereby be determined by the appended claims rather than be limited to the particular embodiment of the invention selected for illustrative purposes.

What is claimed is:

1. A high flow capacity fluid pressure regulator comprising a main housing having a pressure fluid supply inlet and a lower pressure outlet, said housing having a valve seat intermediate said inlet and said outlet, a diaphragm fixed in said housing on the opposite side of said inlet from said seat and dividing said housing into first and second chambers, a tubular member attached at one end to said diaphragm and extending through said seat and first chamber, said member having a radially outwardly extending flange at its other end adjacent said seat, said flange having a valving surface on the side facing said inlet to cooperate with said seat, a relief valve at the other end of said tubular member, said diaphragm and valve surface being exposed to supply fluid pressure on adjacent sides and said diaphragm on the other side and said relief valve on one side being exposed to atmospheric pressure, the other side of said valve surface and the other side of said relief valve being exposed to the fluid pressure in the outlet and an adjustable spring for normally holding said relief valve closed and tending to unseat said valve surface, said spring providing a force independent of the supply fluid pressure and determining the output pressure.

2. In the combination of claim 1, the area of said diaphragm being substantially equal to the area of said valve surface.

3. In the combination of claim 1, a check valve in said inlet for preventing the backflow of fluid.

4. In a high flow capacity fluid pressure controller an outer housing having an inlet passage and an outlet passage, an inner housing, enclosed by said outer housing to form an inlet chamber, having a valve seat defining a fluid supply port communicating with said outlet passage, a tubular supply valve member having valve means at one end cooperating with said seat, a diaphragm fixed to said inner housing and to said tubular member at the end opposite said flange and dividing said inner housing into first and second chambers, means establishing communication between said inlet chamber and said first chamber, means establishing communication between said second chamber and the atmosphere, means forming part of said supply valve member including a relief valve disc defining a passage for establishing communication between said outlet passage and said second chamber, and spring means urging said relief valve disc in a direction to seat it and tend to unseat said valve surface.

5. In the combination of claim 4, the area of said diaphragm being substantially equal to the area of said valve surface.

6. In the combination of claim 4, a spring biased check valve in said inlet to prevent return flow of fluid pressure.

7. A high flow capacity fluid pressure controller having a housing with an inlet passage and an outlet passage means in said housing defining a fluid supply chamber having a first seat defining a passageway opening into said outlet passage, a tubular valve member in said housing having means at one end normally engaging said first seat and also having a second seat at its other end, a diaphragm fixed to said means in said housing and to said valve member intermediate its ends to define a first and a second chamber, said second chamber communicating with the atmosphere, said second seat lying in said second chamber, a valve disc engageable with said second seat, and spring means urging said valve disc to normally seat it and tend to unseat said tubular valve member.

8. In the combination of claim 7, said diaphragm and valve having substantially equal areas.

References Cited
UNITED STATES PATENTS 975,838  11/1910  Derby _____ 137—505.11

WILLIAM F. O'DEA, *Primary Examiner.*

D. H. LAMBERT, *Assistant Examiner.*